United States Patent [19]
Chiang

[11] Patent Number: 5,799,699
[45] Date of Patent: Sep. 1, 1998

[54] BELLOWS WITH AN IMPROVED TWISTING CAPABILITY

[76] Inventor: Hank Chiang, No. 162, Chung-Chen S. Rd., Hsia-Jen Hsiang, Tainan Hsien, Taiwan

[21] Appl. No.: 901,549

[22] Filed: Jul. 28, 1997

[51] Int. Cl.⁶ ..................................... F16L 11/10
[52] U.S. Cl. ................ 138/121; 138/118.1; 138/177; 138/DIG. 11
[58] Field of Search .................. 138/121, 122, 138/177, 173, DIG. 11, 118.1, 178

[56] References Cited

U.S. PATENT DOCUMENTS

| | | | |
|---|---|---|---|
| 1,035,931 | 8/1912 | Woodbridge | 138/121 X |
| 2,819,488 | 1/1958 | Gimbel | 138/121 X |
| 3,412,628 | 11/1968 | DeGain | 138/121 X |
| 3,716,733 | 2/1973 | Keith et al. | 138/121 X |
| 3,785,290 | 1/1974 | Castor et al. | 138/121 X |
| 4,125,130 | 11/1978 | Yamamoto | 138/121 |
| 4,165,110 | 8/1979 | Itzler | 138/121 X |
| 4,802,511 | 2/1989 | Hensley | 138/118.1 |
| 5,439,035 | 8/1995 | Palù | 138/121 |
| 5,564,472 | 10/1996 | Gipperich | 138/121 |

*Primary Examiner*—Patrick F. Brinson
*Attorney, Agent, or Firm*—Frommer Lawrence & Haug, LLP

[57] ABSTRACT

A bellows includes a flexible tube with a pleated wall which has valleys and peaks extending in parallel planes across an axis of the flexible tube. At least one of the valleys and at least one of the peaks extend in a respective one of the planes. Each of the valleys and peaks in a corresponding one of the planes is staggered in an axial direction with the other one of the peaks and valleys in an adjacent one of the planes. The pleated wall further has ridges. Each of the ridges is in the form of a segment of a helix and interconnects a corresponding pair of the staggered peaks.

2 Claims, 5 Drawing Sheets

BELLOWS WITH AN IMPROVED TWISTING CAPABILITY

BACKGROUND OF THE INVENTION

1. Field of the Invention

This invention relates to a bellows, more particularly to a bellows with an improved twisting capability.

2. Description of the Related Art

Referring to FIG. 1, a conventional bellows is shown to comprise a flexible tube 10 with a pleated wall. The pleated wall of the flexible tube 10 has annular valleys 16 and peaks 15 alternatingly extending in parallel planes across an axis of the flexible tube 10. As shown, the conventional bellows is employed to interconnect a lamp mounting seat 20 and a battery receiving tube 30 of a lamp device. A foam member 12, a copper wire 13 and an electrical wire 14 are received in the flexible tube 10. In use, with reference to FIG. 2, the conventional bellows is bent in order to move the lamp mounting seat 20 to a desired position with respect to the battery receiving tube 30 for illuminating purposes. However, twisting of the flexible tube 10 of the conventional bellows is somewhat difficult to conduct.

SUMMARY OF THE INVENTION

It is therefore a main object of the present invention to provide a bellows with an improved twisting capability.

According to the present invention, a bellows comprises a flexible tube with a pleated wall which has valleys and peaks extending in parallel planes across an axis of the flexible tube, at least one of the valleys and at least one of the peaks extending in a respective one of the planes, each of the valleys and peaks in a corresponding one of the planes being staggered in an axial direction with the other one of the peaks and valleys in an adjacent one of the planes, the pleated wall further having ridges, each of the ridges being in the form of a segment of a helix and interconnecting a corresponding pair of the staggered peaks.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
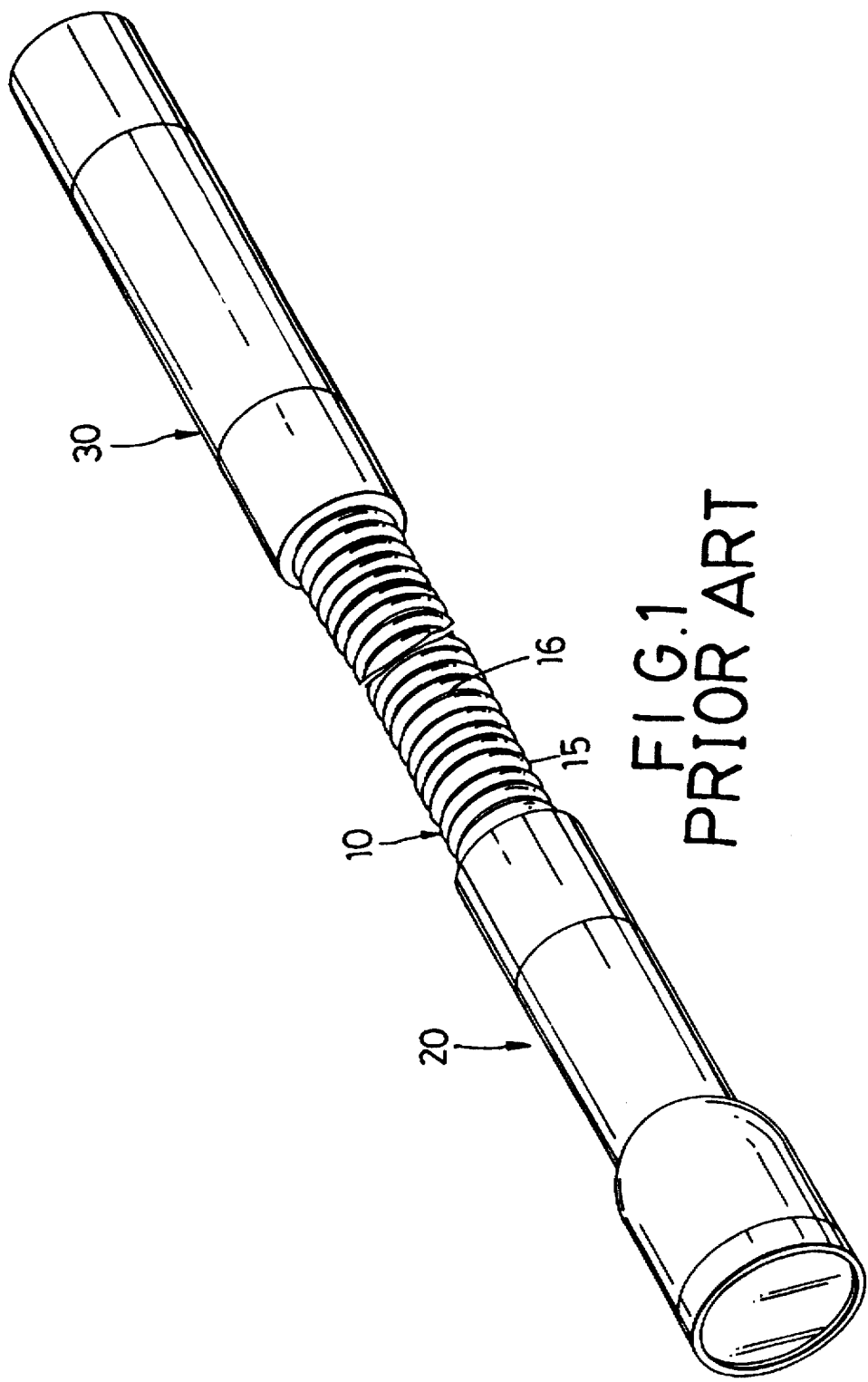
FIG. 1 is a perspective view of a conventional bellows which is employed to interconnect a lamp mounting seat and a battery receiving tube.
Figure 2:
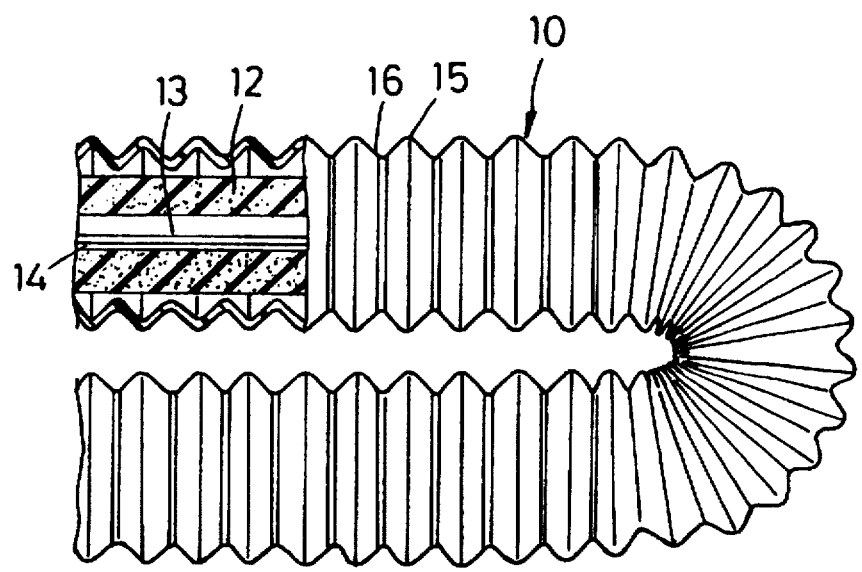
FIG. 2 is a partly sectional view of the conventional bellows in a bent position.
Figure 3:
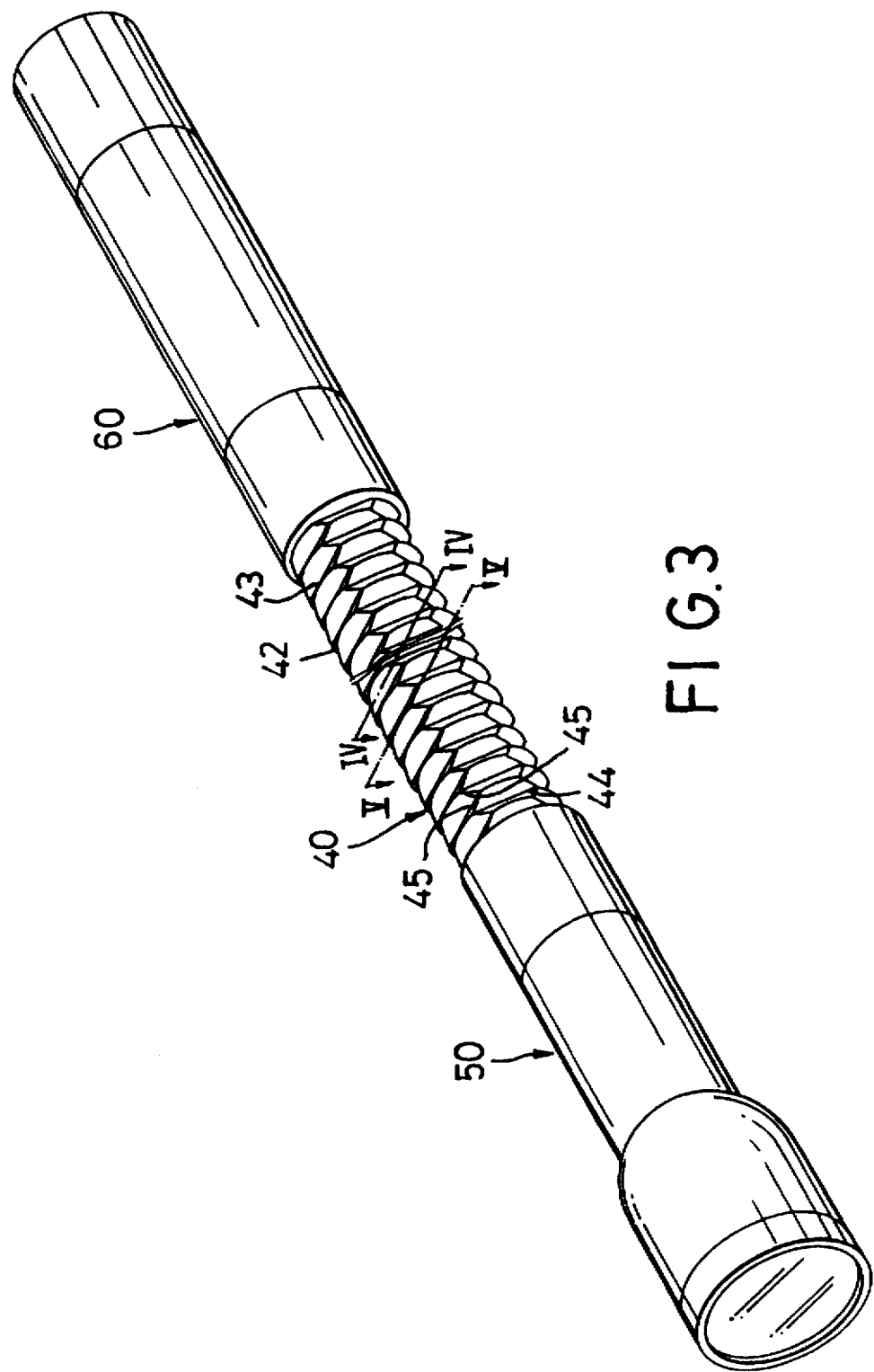
FIG. 3 is a perspective view of a preferred embodiment of a bellows which is employed to interconnect a lamp mounting seat and a battery receiving tube according to the present invention.

Referring to FIG. 3, a preferred embodiment of a bellows 40 of the present invention is used to interconnect a lamp mounting seat 50 and a battery receiving tube 60 in a conventional manner and is shown to comprise a flexible tube 42 with a pleated wall. The flexible tube 42 has an axial bore 41 in which a foam member 70, a copper wire 80 and an electrical wire 90 are received in a known manner, as best illustrated in FIGS. 3 and 4.

Figure 4:
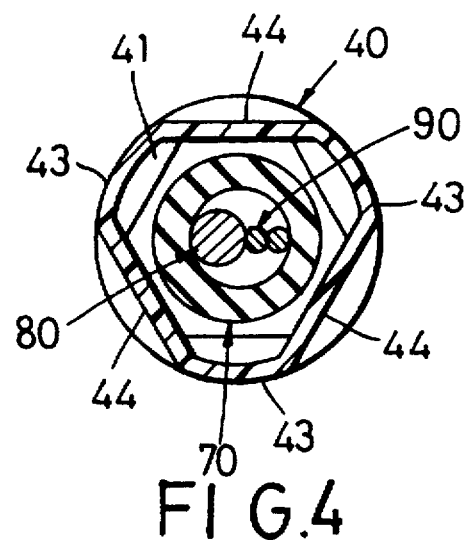
FIG. 4 is a cross sectional view taken along the line IV—IV in FIG. 3.
Figure 5:
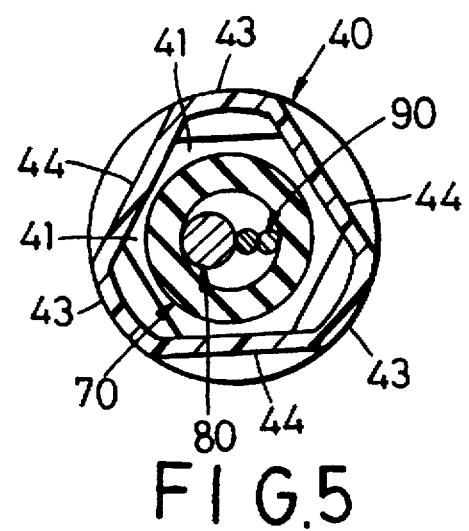
FIG. 5 is a cross sectional view taken along the line V—V in FIG. 3.

Referring to FIGS. 3, 4 and 5, the pleated wall of the flexible tube 42 has valleys 44 and peaks 43 extending in parallel planes across an axis of the flexible tube 42. Three valleys 44 and three peaks 43 extend in a respective one of the planes. Each of the valleys 44 and peaks 43 in a corresponding one of the planes is staggered in an axial direction with the other one of the peaks 43 and valleys 44 in an adjacent one of the planes. The pleated wall of the flexible tube 42 further has ridges 45. Each of the ridges 45 is in the form of a segment of a helix and interconnects a corresponding pair of the staggered peaks 43.

Figure 6:
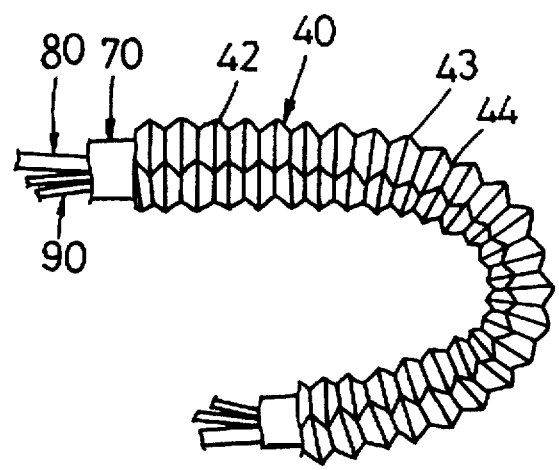
FIG. 6 is a perspective schematic view illustrating the bellows of the preferred embodiment in a bent position.
Figure 7:
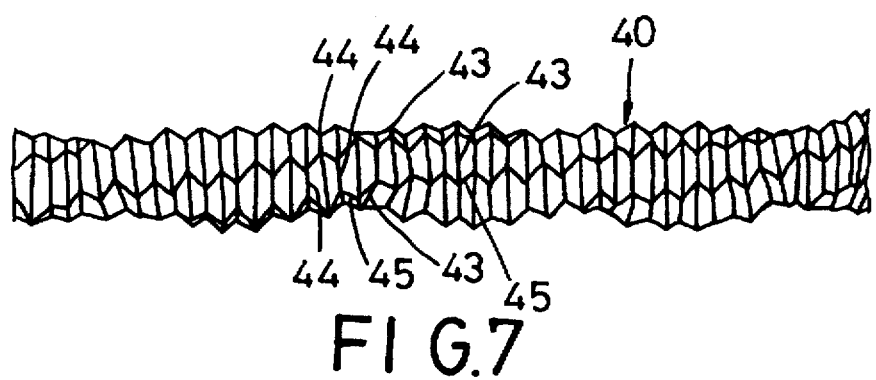
FIG. 7 is a perspective schematic view illustrating the bellows of the preferred embodiment in a twisted position.

Referring to FIG. 6, in use, the bellows 40 may be bent as the conventional bellows 10. In addition, with the aforementioned arrangement, it is found that the bellows 40 can be twisted easily as desired, as best illustrated in FIG. 7.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

I claim:

1. A bellows comprising:
a flexible tube having a pleated wall of polygonal cross-section which has a plurality of sides and which has valleys and peaks extending along said sides in parallel planes orthogonal to an axis of said flexible tube, a plurality of said valleys and a plurality of said peaks extending alternately along said sides in each of said planes, each of said valleys and said peaks in each of said planes forming a respective one of said sides, each of said valleys and peaks in a corresponding one of said planes being staggered in an axial direction with the other one of said peaks and valleys in an adjacent one of said planes, said pleated wall further having ridges, each of said ridges being in the form of a segment of a helix and interconnecting a corresponding pair of said staggered peaks, said ridges being aligned helically along a length of said flexible tube.

2. The bellows as claimed in claim 1, wherein the polygonal cross-section of said pleated wall has six sides.

* * * * *